US011001202B2

(12) United States Patent
Steffes

(10) Patent No.: US 11,001,202 B2
(45) Date of Patent: May 11, 2021

(54) METHOD OF ASSEMBLING A MIRROR HEAD FOR A VEHICULAR INTERIOR REARVIEW MIRROR ASSEMBLY

(71) Applicant: Magna Mirrors of America, Inc., Holland, MI (US)

(72) Inventor: Matthew V. Steffes, Kentwood, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 16/947,773

(22) Filed: Aug. 17, 2020

(65) Prior Publication Data

US 2020/0377019 A1 Dec. 3, 2020

Related U.S. Application Data

(62) Division of application No. 16/164,876, filed on Oct. 19, 2018, now Pat. No. 10,744,944.

(60) Provisional application No. 62/728,889, filed on Sep. 10, 2018, provisional application No. 62/671,099, filed on May 14, 2018, provisional application No. 62/575,648, filed on Oct. 23, 2017.

(51) Int. Cl.
| | |
|---|---|
| *B60R 1/04* | (2006.01) |
| *B60R 1/08* | (2006.01) |
| *F16B 2/18* | (2006.01) |
| *F16B 2/24* | (2006.01) |

(52) U.S. Cl.
CPC ............... *B60R 1/04* (2013.01); *B60R 1/086* (2013.01); *F16B 2/18* (2013.01); *F16B 2/24* (2013.01)

(58) Field of Classification Search
CPC ..... B60R 1/04; B60R 1/086; F16B 2/18; F16B 2/24
See application file for complete search history.

(56) References Cited

U.S. PATENT DOCUMENTS

| | | |
|---|---|---|
| 3,928,894 A | 12/1975 | Bury et al. |
| 5,327,288 A | 7/1994 | Wellington et al. |
| 5,377,948 A | 1/1995 | Suman et al. |
| 5,820,097 A | 10/1998 | Spooner |
| 5,931,440 A | 8/1999 | Miller |

(Continued)

FOREIGN PATENT DOCUMENTS

| | | |
|---|---|---|
| DE | 10060447 A1 | 6/2002 |
| DE | 10256835 A1 | 6/2004 |

(Continued)

*Primary Examiner* — Anita M King
(74) *Attorney, Agent, or Firm* — Honigman LLP

(57) ABSTRACT

A method of assembling a mirror head for an interior rearview mirror assembly for a vehicle includes providing a mirror casing, a prismatic reflective element at the mirror casing, and a toggle mechanism. A pivot mount of the toggle mechanism is inserted into an upper or lower receiving portion of the mirror casing, and a body portion of the toggle mechanism is separated from a toggle lever of the toggle mechanism via breaking a frangible portion of the toggle mechanism. After breaking the frangible portion of the toggle mechanism, a second pivot mount of the toggle mechanism is inserted into the lower or upper receiving portion of the mirror casing, whereby corresponding engaging surfaces of the body portion and the toggle lever engage one another such that, when the toggle lever pivots relative to the lower receiving portion of the mirror casing, the mirror casing pivots relative to the body portion.

27 Claims, 12 Drawing Sheets

(56) References Cited

U.S. PATENT DOCUMENTS

| | | | |
|---|---|---|---|
| 6,042,076 | A | 3/2000 | Moreno |
| 6,824,281 | B2 | 11/2004 | Schofield et al. |
| 6,877,709 | B2 | 4/2005 | March et al. |
| 7,289,037 | B2 | 10/2007 | Uken et al. |
| 8,451,332 | B2 | 5/2013 | Rawlings |
| 8,851,690 | B2 | 10/2014 | Uken et al. |
| 9,156,403 | B2 | 10/2015 | Rawlings et al. |
| 9,174,577 | B2 | 11/2015 | Busscher et al. |
| 9,333,916 | B2 | 5/2016 | Uken et al. |
| 9,475,431 | B2 | 10/2016 | Brummel et al. |
| 10,144,353 | B2 | 12/2018 | Karner et al. |
| 10,538,201 | B2 | 1/2020 | De Wind |
| 10,744,944 | B2 | 8/2020 | Steffes |
| 2004/0079853 | A1 | 4/2004 | Suzuki et al. |
| 2005/0164541 | A1 | 7/2005 | Joy et al. |
| 2009/0096235 | A1 | 4/2009 | Tanaka et al. |
| 2013/0062497 | A1 | 3/2013 | Van Huis et al. |
| 2014/0226012 | A1 | 8/2014 | Achenbach |
| 2015/0251605 | A1 | 9/2015 | Uken et al. |
| 2015/0334354 | A1 | 11/2015 | Uken et al. |
| 2018/0297526 | A1 | 10/2018 | Hennig et al. |

FOREIGN PATENT DOCUMENTS

| | | |
|---|---|---|
| DE | 102008011871 A1 | 9/2009 |
| DE | 102010010571 A1 | 9/2011 |
| EP | 2048030 A2 | 4/2009 |
| JP | 2009096227 A | 5/2009 |
| WO | 2017168316 A1 | 10/2017 |

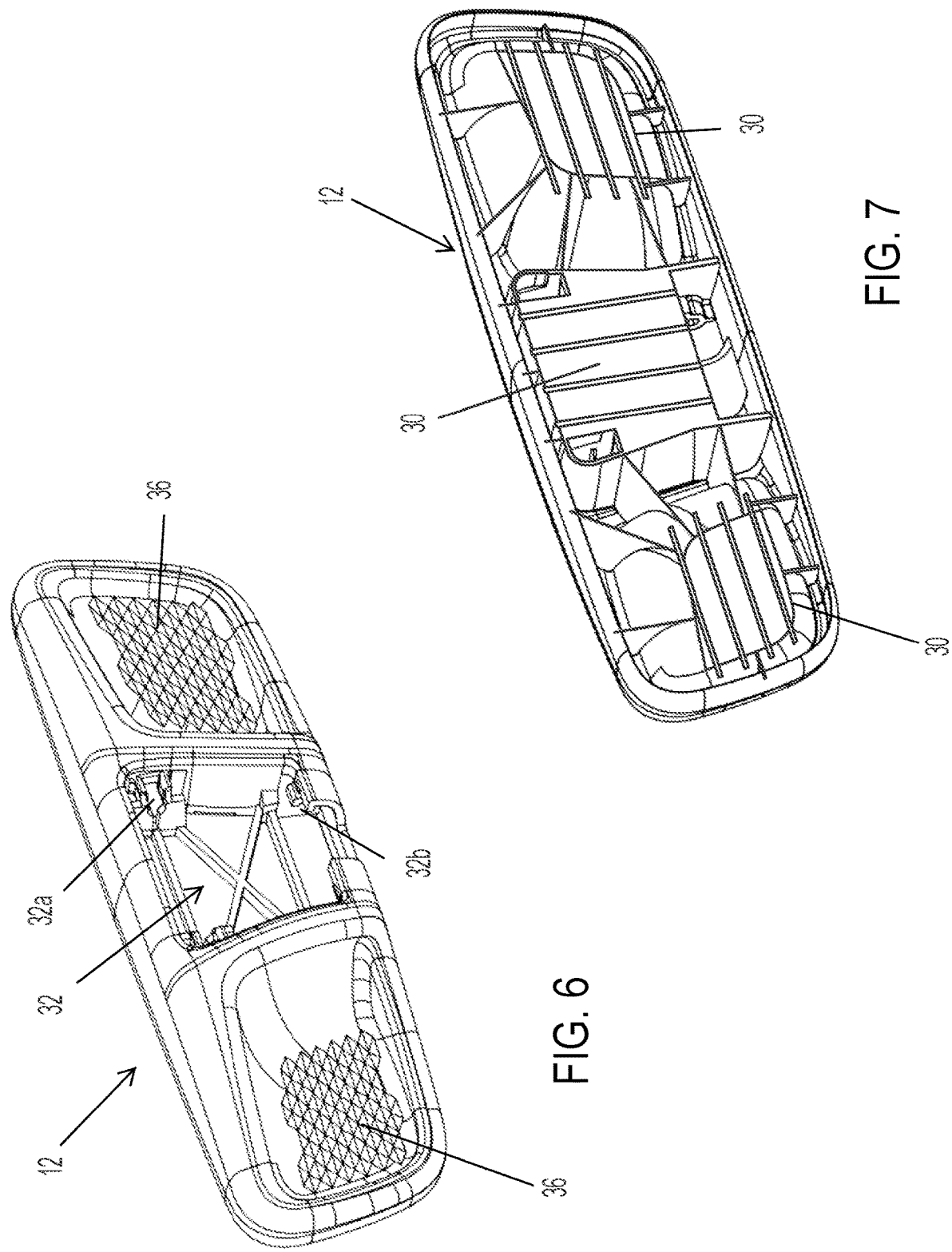

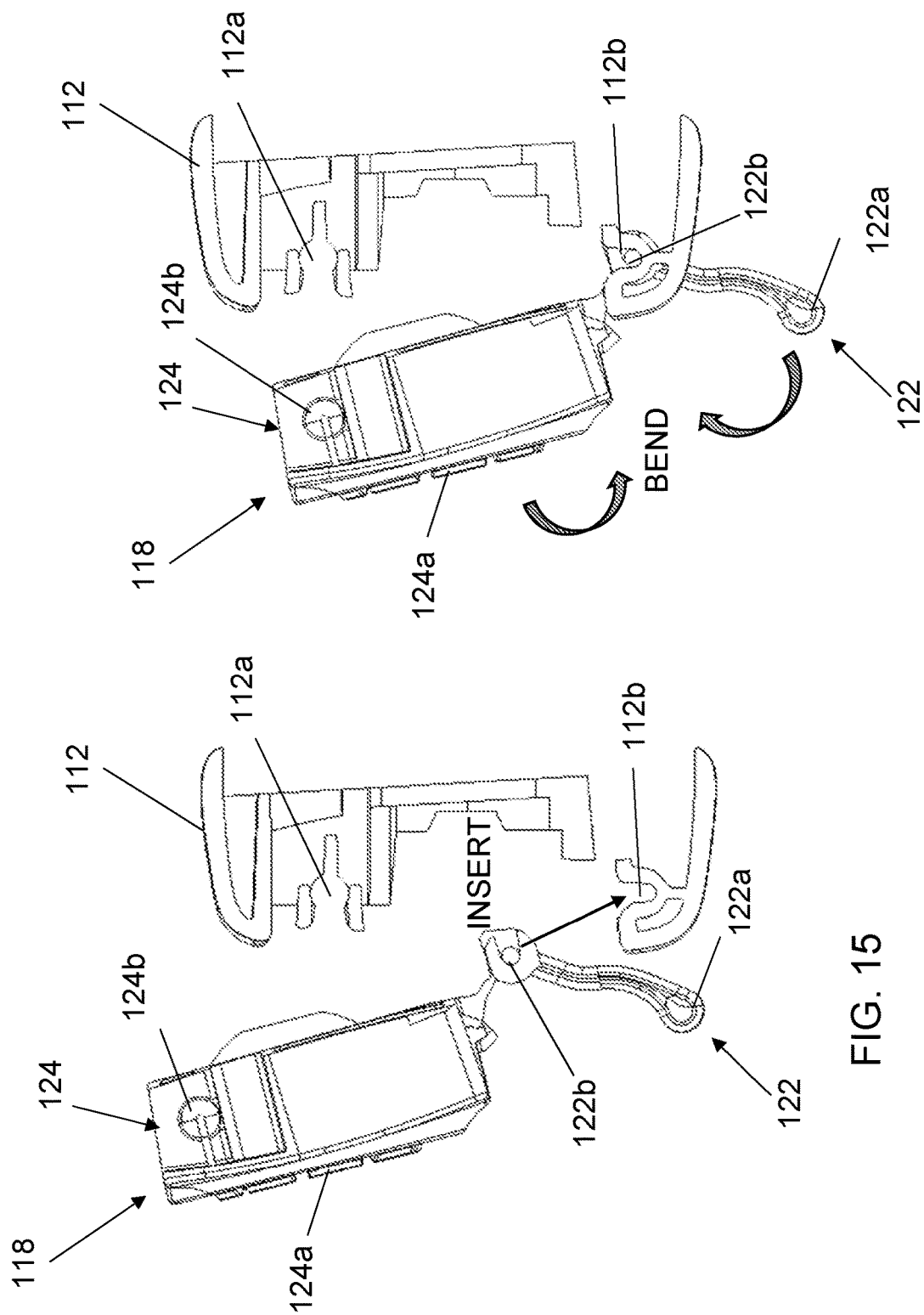

METHOD OF ASSEMBLING A MIRROR HEAD FOR A VEHICULAR INTERIOR REARVIEW MIRROR ASSEMBLY

CROSS REFERENCE TO RELATED APPLICATIONS

The present application is a division of U.S. patent application Ser. No. 16/164,876, filed Oct. 19, 2018, now U.S. Pat. No. 10,744,944, which claims the filing benefits of U.S. provisional application Ser. No. 62/728,889, filed Sep. 10, 2018, U.S. provisional application Ser. No. 62/671,099, filed May 14, 2018, and U.S. provisional application Ser. No. 62/575,648, filed Oct. 23, 2017, which are hereby incorporated herein by reference in their entireties.

FIELD OF THE INVENTION

The present invention relates generally to the field of interior rearview mirror assemblies for vehicles.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide an interior mirror assembly with a prismatic reflective element that may be manually toggled between daytime and nighttime reflectivity positions. An example of such is described in U.S. Pat. No. 6,318,870, which is hereby incorporated herein by reference in its entirety.

SUMMARY OF THE INVENTION

The present invention provides an interior rearview mirror assembly that includes a metallic spring clip for attaching the mirror assembly at a mirror mounting button adhesively attached at an interior surface of a vehicle windshield. The mirror assembly may also or otherwise provide enhanced assembly features, such as for snap attaching the mirror assembly at the mounting button without fasteners and for loading or attaching a toggle mechanism or structure at the rear of the mirror head, without fasteners or additional components.

Optionally, the interior rearview mirror assembly may include a prismatic reflecting element and a mirror casing with a toggle mechanism or assembly that adjusts the viewing angle of the prismatic reflecting element. The toggle mechanism may include a toggle lever and a body portion that are molded together (such as via injection molding of a polymeric resin) as a single piece, with the toggle lever and body portion joined by a thin frangible web or element (that is molded along with the rest of the toggle mechanism). During assembly of the mirror head, the thin frangible web is broken to separate the toggle lever from the body portion after one of the toggle lever and body portion is pivotally attached at a respective lower or upper portion of the mirror casing. The assembled mirror head is mounted via attachment of a mounting structure or feature of the toggle mechanism at a mounting base or mirror mount that is disposed at an interior portion of a vehicle so as to pivotally or adjustably mount the mirror head at the mirror mount disposed at the interior portion of the vehicle.

These and other objects, advantages, purposes and features of the present invention will become apparent upon review of the following specification in conjunction with the drawings.

BRIEF DESCRIPTION OF THE DRAWINGS

FIG. 6 is a perspective view of the back side of the mirror housing;

FIG. 7 is a perspective view of the front side of the mirror housing, showing the attaching surfaces for attaching the mirror reflective element to the mirror housing;

FIGS. 15 and 16 are side views showing attachment of the toggle lever at a lower part of the mirror casing;

DESCRIPTION OF THE PREFERRED EMBODIMENTS

Figure 1:
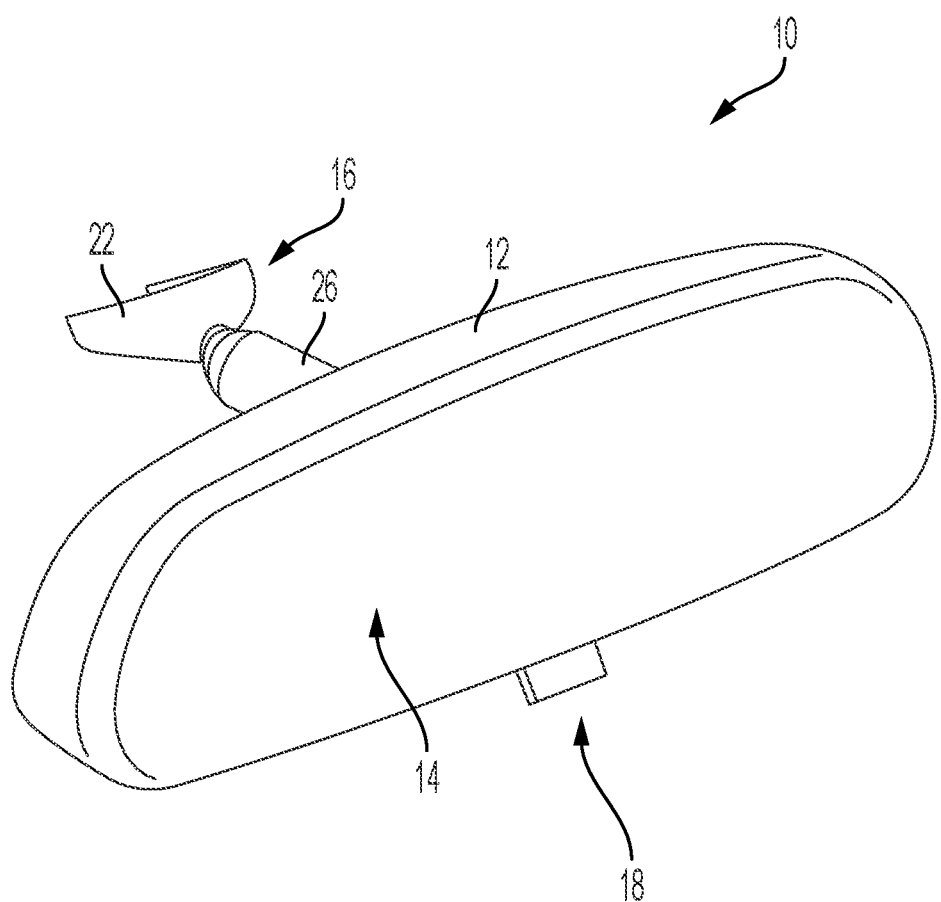
FIG. 1 is an exploded perspective view of an interior rearview mirror assembly in accordance with the present invention.
Figure 2:
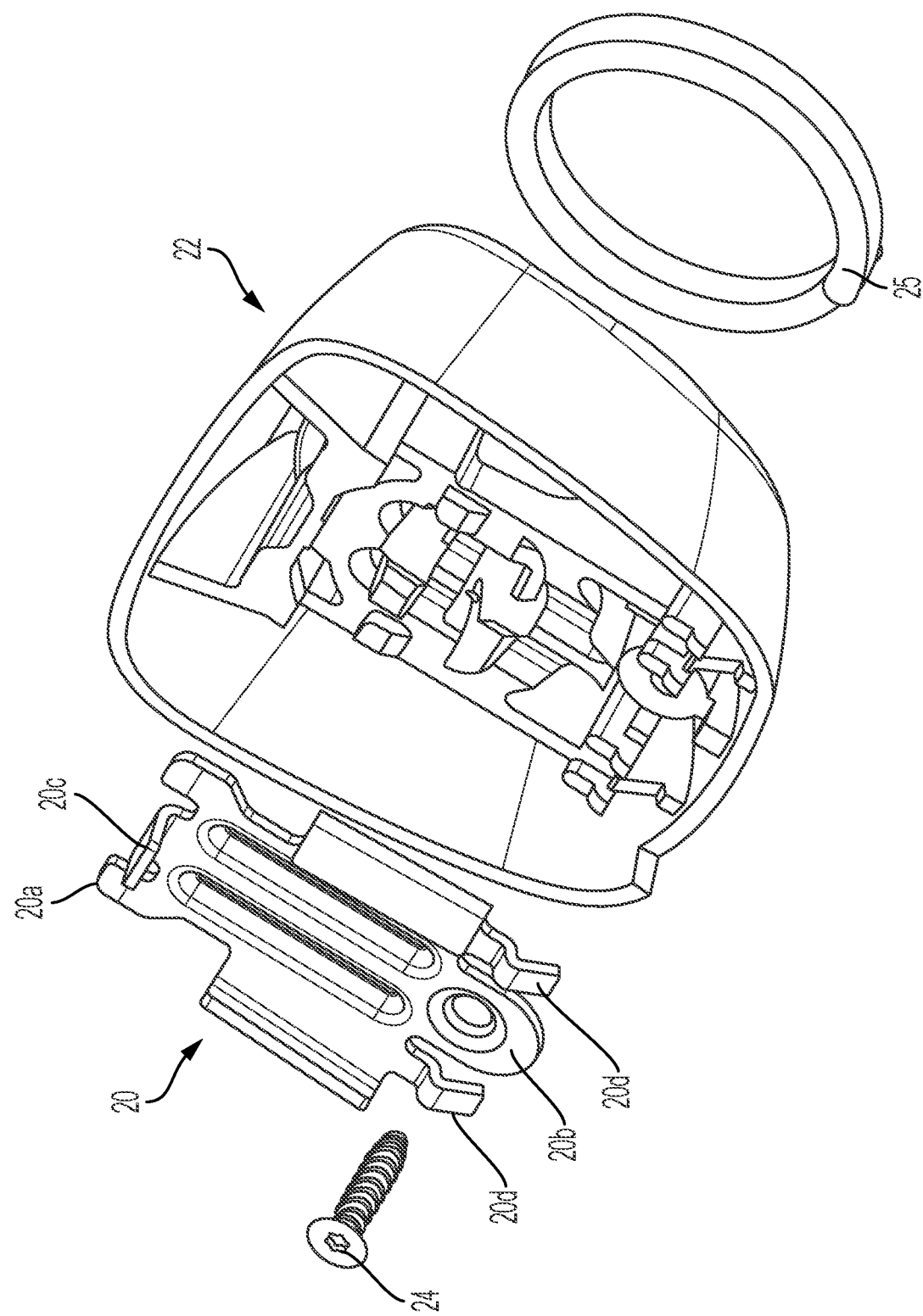
FIG. 2 is an exploded perspective view of a mirror mount with a spring clip in accordance with the present invention.
Figure 3:
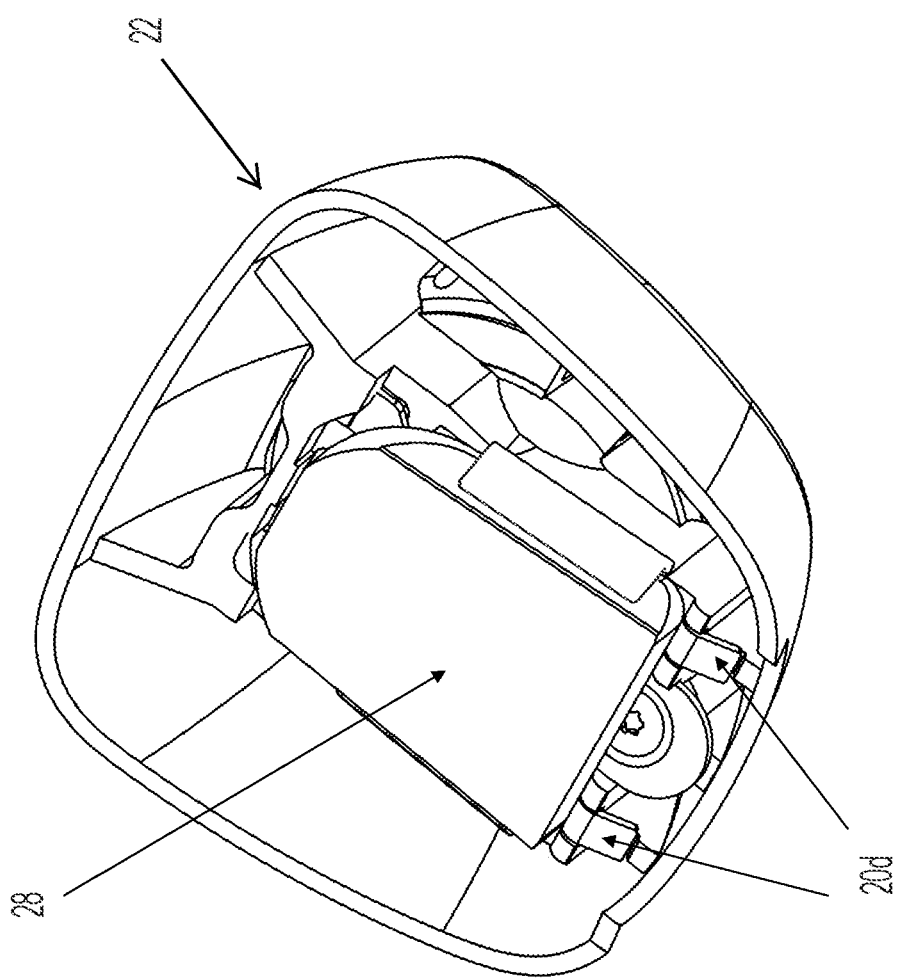
FIG. 3 is a perspective view of the mirror mount of FIG. 2, with a mirror mounting button attached at the spring clip.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a prismatic mirror reflective element that is flipped between a daytime position and a nighttime position via a toggle element 18 (discussed below). Optionally, aspects of the present invention may be suitable for use with a variable reflectance mirror reflective element that varies its reflectance responsive to electrical current applied to conductive coatings or layers of the reflective element. The mirror mounting assembly 16 comprises a spring clip 20 (or wedge stamping as shown in FIGS. 2 and 3) for attaching the mirror mount 22 (of the mounting assembly 16) to the mirror mounting button adhered at the in-cabin surface of the vehicle windshield. The spring clip replaces the known channel mount that typically attaches to a wedge-style mirror mounting button.

The spring clip 20 comprises a piece of stamped spring steel that is attached to the plastic window-end socket by tucking two tabs 20a into undercuts on one end of the mirror mount or socket 22 and by screwing down into the other end 20b via a fastener or screw 24. This allows for an open-shut tool for the window-end socket (no side actions). As shown in FIG. 2, the spring clip 20 is attached at the mirror mount or socket 22 of the mounting assembly 16 by inserting and fastening the clip 20 at the windshield facing side of the mirror mount 22. A coil spring 25 is inserted into the socket side of the mirror mount 22 for retaining the ball member of the mounting arm 26 at the socket of the mirror mount, as discussed below. The mirror mount, spring clip and coil spring are assembled together to form a windshield mount sub-assembly, which can be readily attached at the mirror mounting button 28 (FIG. 3), either before or after the mounting arm and mirror head are attached at the socket of the mirror mount.

The spring clip slides onto the wedge-style windshield button 28 (as shown in FIG. 3, but the button is attached at the in-cabin surface of the vehicle windshield when the spring clip is slid onto the button) in a similar fashion to the zinc channel mount mirror stay does on known double-ball interior mirror assemblies. For example, the spring clip slides downward along the windshield and along the mounting button until a stop element or tab 20c of the spring clip 20 contacts or engages the upper end of the mounting button 28, thereby limiting further downward movement of the clip along the mounting button. The spring clip does not require a set screw to lock the mirror mount to the button. Rather, two flexible anti-backout features or tabs 20d keep the mirror mount (and mirror) in place after installation. The anti-backout tabs 20d flex away from the windshield and slide along the surface of the mounting button (that is opposite the windshield) as the spring clip slides along the mounting button. As can be seen in FIG. 3, when the spring clip (and mirror mount 22) is slid onto the button and stopped by the stop tab 20c, the anti-backout features or tabs 20d (which are biased toward the locking position) flex or snap toward the windshield at the lower end of the mounting button to limit or substantially preclude upward movement of the spring clip and mirror mount along the mounting button. The mirror mount (and mirror) can be removed from the button without an uninstallation tool by lifting the mirror mount off of the button (against the spring tension provided by the spring clip), and sliding the anti-backout features past the edge of the button.

Thus, the spring clip and mirror mount sub-assembly of the present invention provides for easier assembly of the mirror mount (and mirror) at the windshield mounting button, since no set screw is needed to secure the mirror mount at the mounting button. Instead, an operator at the assembly facility may readily slide the mirror mount onto the button, whereby the anti-backout features 20d snap over the end of the button to limit or preclude the mirror mount from sliding off of the button. The spring clip is also readily installed or attached at the mirror mount via a single fastener, with the mount and the clip designed and formed to have interlocking or engaging portions to retain one end of the clip at the mount, and with the fastener or screw securing the other end of the clip. Optionally, the mirror mount and clip may be designed and formed to have the spring clip snap into a receiving structure of the mirror mount so as to attach to the mirror mount without any fastener(s).

Figure 4:
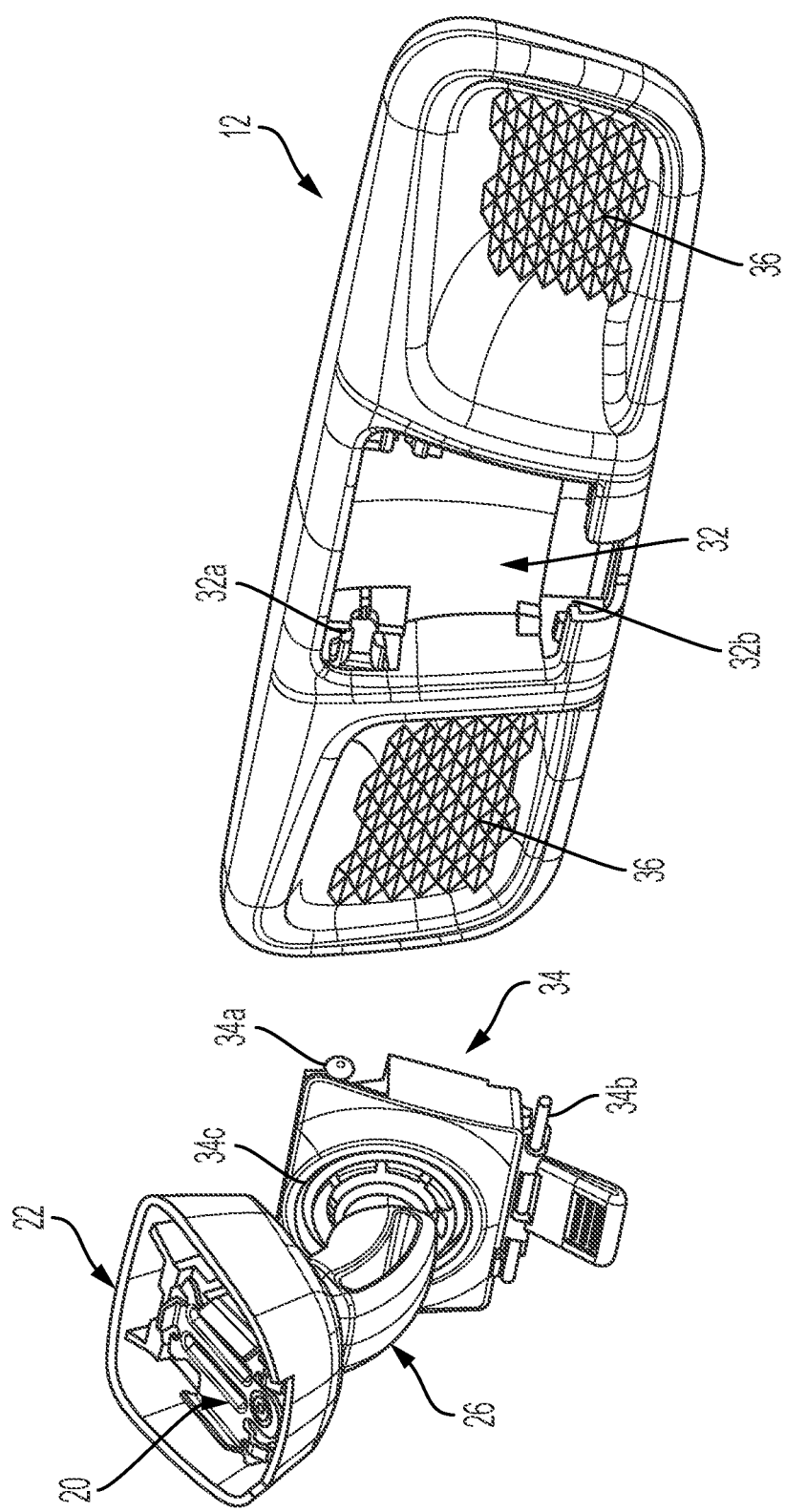
FIGS. 4 and 5 are exploded perspective views of the mirror head and mirror mount sub-assembly, showing the attachment features for attaching the toggle mechanism at the mirror housing.
Figure 5:
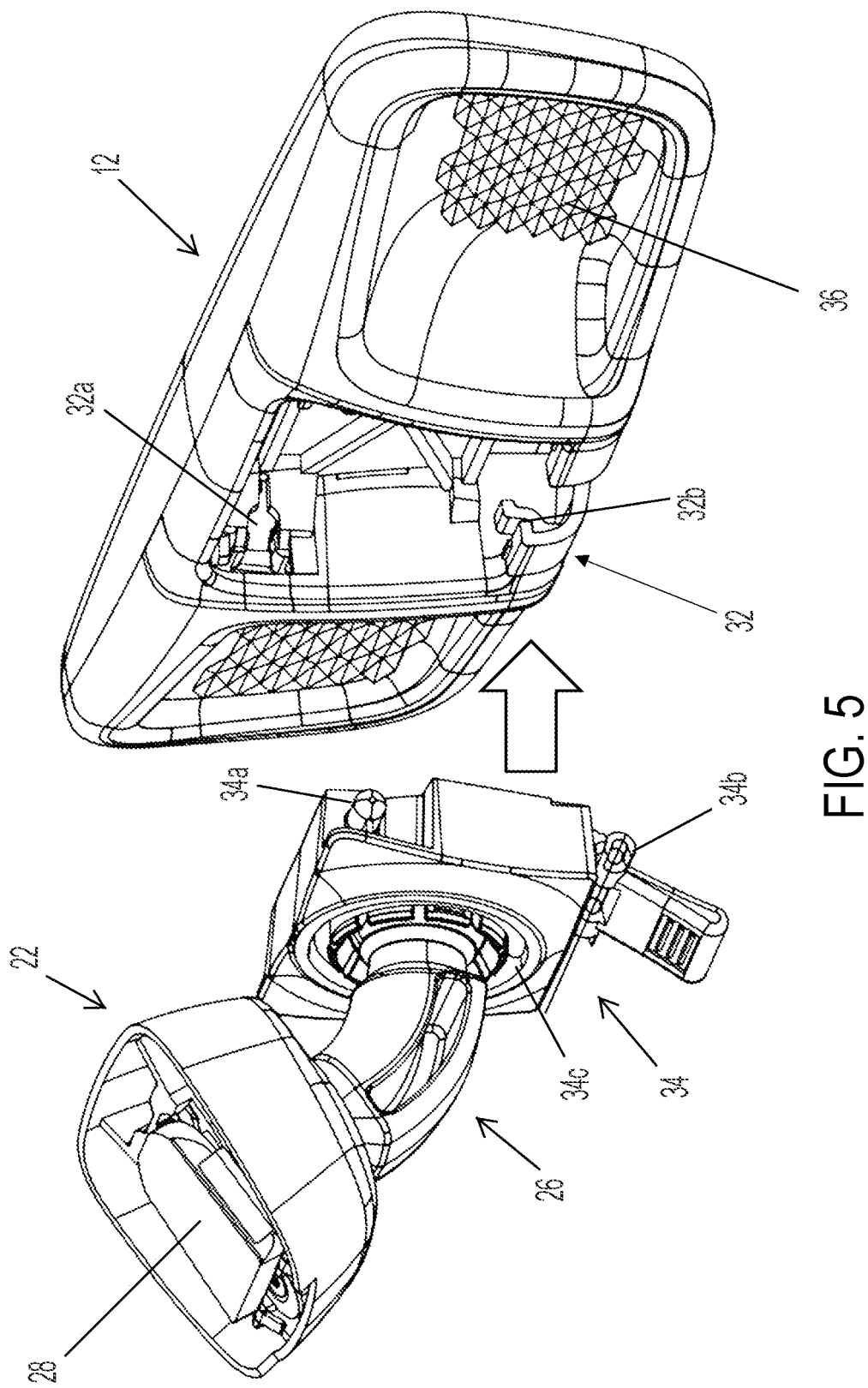

In the illustrated embodiment, the mirror reflective element comprises a prismatic reflective element that is flappable between a daytime position and a nighttime position. The mirror assembly comprises a low profile mirror head (such as by utilizing aspects of the mirror assemblies described in U.S. Publication No. US-2015-0334354, which is hereby incorporated herein by reference in its entirety), with a casing or housing or mirror support element 12 that has attachment surfaces 30 (FIG. 7) at which the mirror reflective element 14 is adhered to, and that has a receiving structure 32 at its opposite side for receiving a toggle mechanism or structure 34 (FIGS. 4 and 5) thereat. As shown in FIGS. 4 and 5, the toggle mechanism 34 is loaded from the front side (the side facing forward in the vehicle when the mirror assembly is mounted at the vehicle) of the housing (opposite side of the glass) during assembly.

As can be seen in FIGS. 4-6, the receiving structure 32 comprises a recessed area with a pair of upper slots or retaining features 32a that are configured to receive and retain (via flexible anti-backout tabs) upper posts or pins 34a of the toggle mechanism 34. The recessed area also comprises a pair of lower retaining features 32b that are configured to receive and retain lower posts or pins 34b of the toggle mechanism. Thus, during assembly of the mirror, the lower hinge pins 34b (above the tab) hooks into the journal or retaining features 32b at the receiving structure 32 of the housing, and then the toggle mechanism pivots about a pivot axis of the lower hinge pins such that upper posts 34a (on either side above the socket) pivot and snap into the slots or journals 32a at the receiving structure 32.

Insertion of the toggle mechanism 34 from the back side (the side facing the vehicle windshield) of the mirror housing can allow for automation of the assembly process. Also, and as shown in FIGS. 4 and 5, the housing comprises recessed areas 36 at either side of the toggle receiving structure 32. The recessed areas of the housing are integrated into the styling and also provide attachment portions or areas 30 (FIG. 7) for adhesive bonding directly between housing and the mirror reflective element, such that no separate attachment plate is needed to attach the mirror reflective element at the mirror housing.

Figure 8:
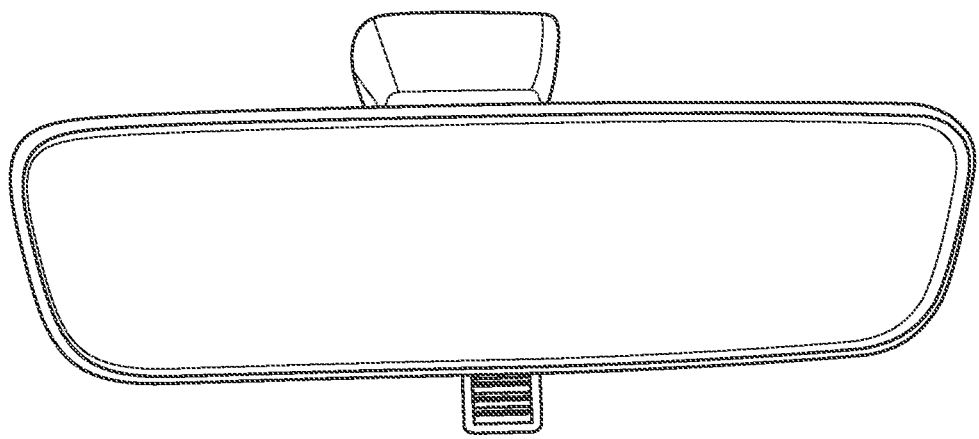
FIGS. 8-10 are perspective views of the mirror assembly, shown with the toggle mechanism mounted at the mirror housing.
Figure 9:
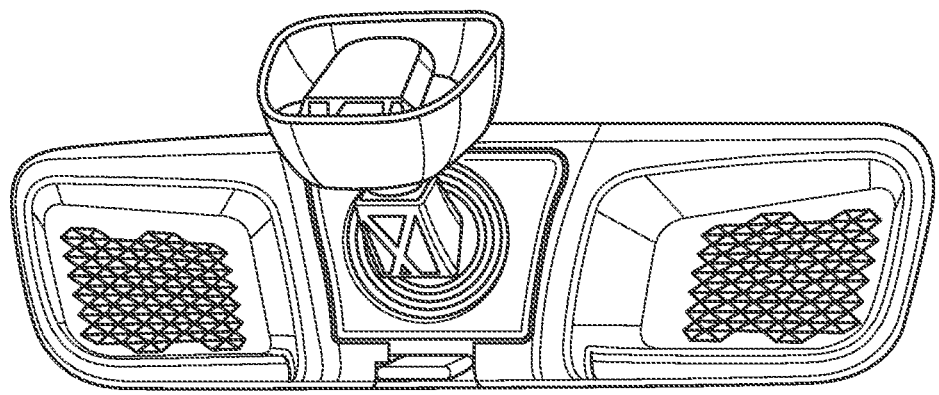
Figure 10:
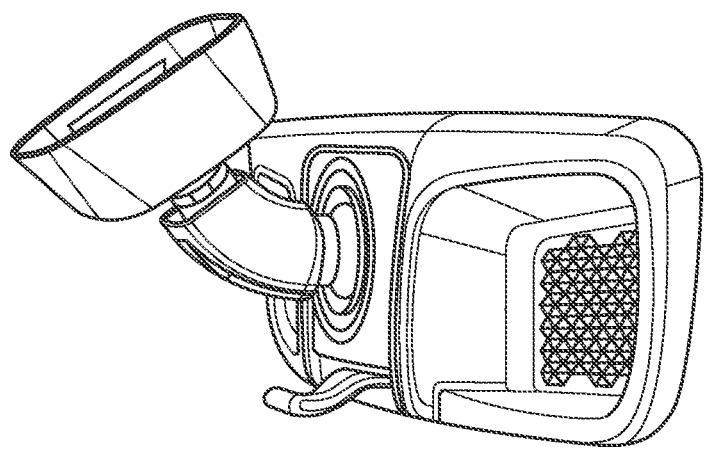
Figure 11:
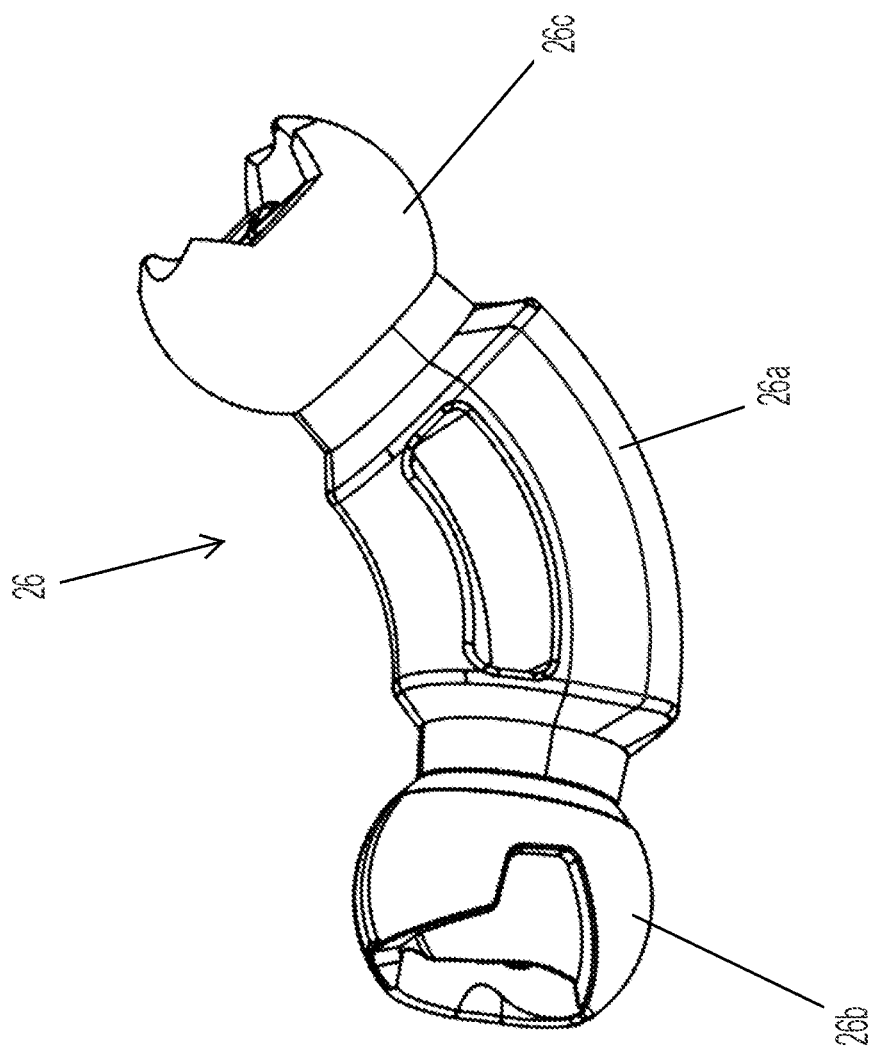
FIG. 11 is a perspective view of a plastic mounting arm for the mounting assembly of the mirror assembly of the present invention.

As shown in FIGS. 4, 5 and 8, the mounting arm 26 comprises a plastic 2-ball linkage piece that has one end pivotally received at the socket of the mirror mount 22 (and retained therein via the coil spring 25) and the other end pivotally received at a socket 34c of the toggle mechanism 34. The plastic 2-ball linkage 26 comprises a single piece made entirely of plastic (such as via injection molding of a plastic material), with a longitudinally curved or bent arm portion 26a and a ball member or partial ball member 26b at one end for pivotally attaching at the mirror mount 22 and a ball member or partial ball member 26c at the other end for pivotally attaching at the toggle mechanism 34. The socket structure and/or retaining springs at each socket may be selected to provide greater resistance to pivoting at one end of the mounting arm than the other. For example, the mounting arm may have greater resistance to pivoting at the socket of the mirror mount as compared to the resistance to pivoting of the toggle mechanism and mirror head at the other end of the mounting arm. The ball members and respective sockets may be formed to resist or limit pivoting within a range of selected or appropriate pivotal movement. The plastic 2-ball linkage takes the place of the conventional two-ball assembly, which typically comprises two powdercoated zinc ball studs, a painted and swaged aluminum tube, a steel coil spring, and two plastic cups.

Optionally, the toggle mechanism may be molded via a two-shot molding process or insert mold or over mold such that a stiffer material (such as a Polyoxymethylene (POM) or acetal or the like) can be used for the assembly body and socket, while a more flexible material (such as a Polypropylene (PP) or the like) may be used for the living hinge detail at the bottom of the molded toggle mechanism. The stiffer material for the main assembly body provides enhanced vibration stability performance for the mirror and more consistent manual efforts or torque on the ball and socket through temperature variations. The toggle body and socket thus may be molded of the stiffer polymeric material, and the flexible material may then be molded over the stiffer polymeric material to form the living hinge and other parts of the toggle mechanism.

Thus, the mounting arm and mounting assembly (including the mirror mount and spring clip) of the present invention provides for a reduction in number of parts and easier assembly. The toggle mechanism and mirror housing also provide for a reduction in number of parts (no back plate or fasteners needed) and easier assembly, since the toggle mechanism can readily snap into the receiving structure at the rear of the mirror housing.

Thus, during assembly of the mirror, the spring clip is inserted and fastened at the mirror mount and the coil spring is inserted into the socket of the mirror mount to form the windshield mount sub-assembly. The mounting arm is inserted into the socket of the mirror mount and into the socket of the toggle mechanism to form the two-ball mount sub-assembly. The mirror reflective element is adhered to the attaching surfaces of the mirror housing or support structure to form a housing/glass sub-assembly. The toggle mechanism is then inserted into the receiving structure of the housing (and snapped therein to retain the toggle mechanism without use of fasteners or the like) to form the prismatic mirror assembly.

Figure 13:
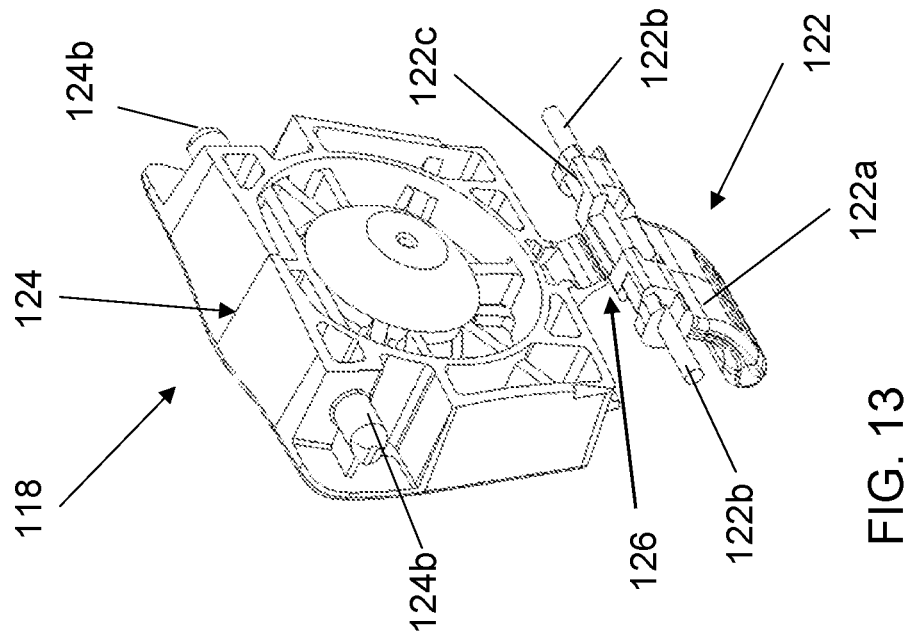
FIGS. 12 and 13 are perspective views of a toggle assembly for a prismatic mirror assembly, shown as a unitarily molded part.
Figure 12:
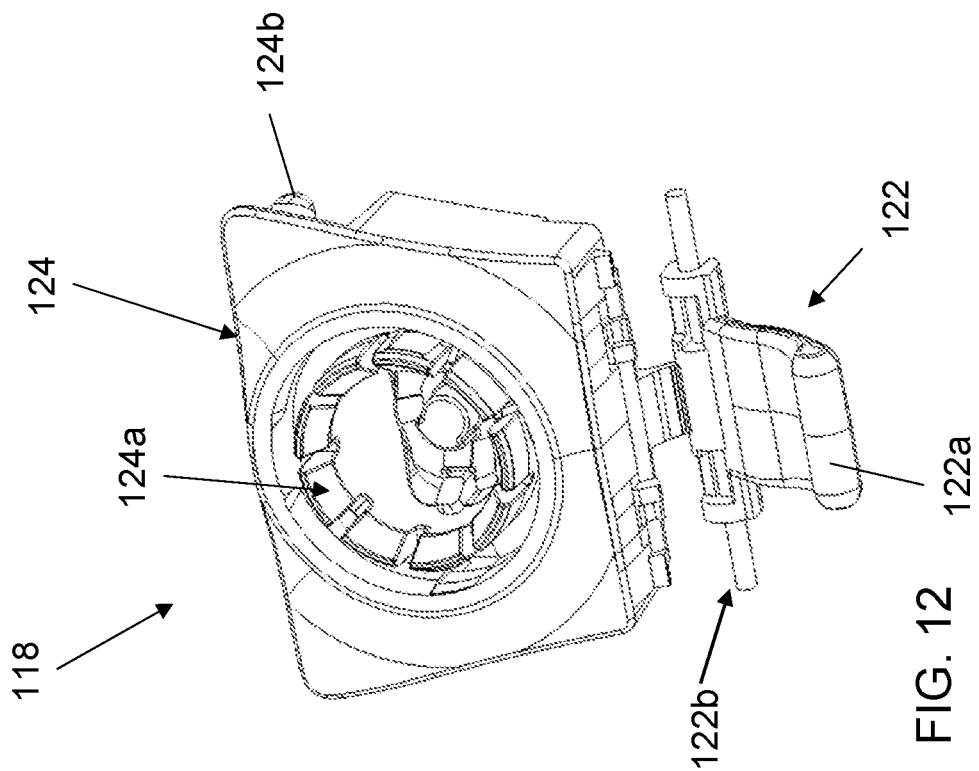
Figure 14A:
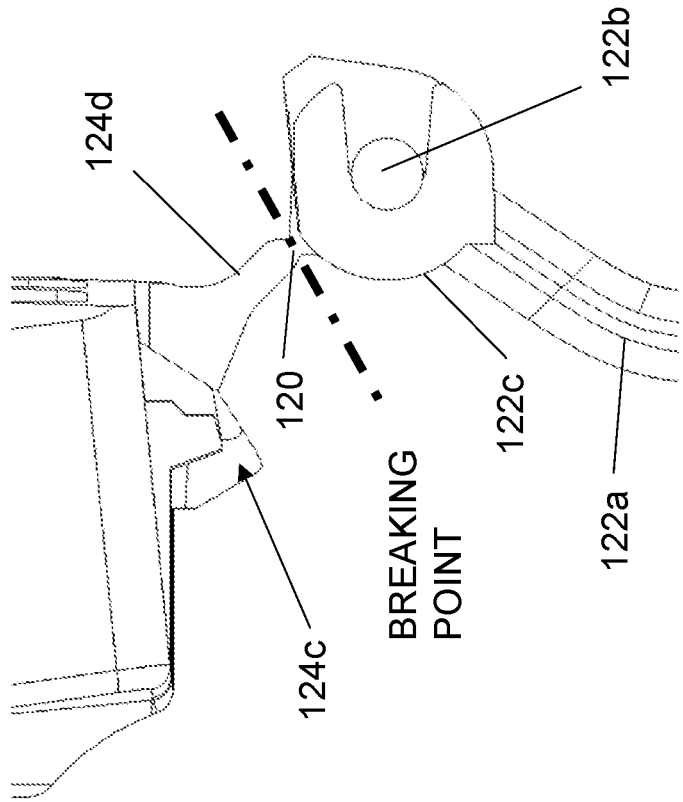
FIG. 14A is an enlarged view of the area A in FIG. 14.
Figure 14:
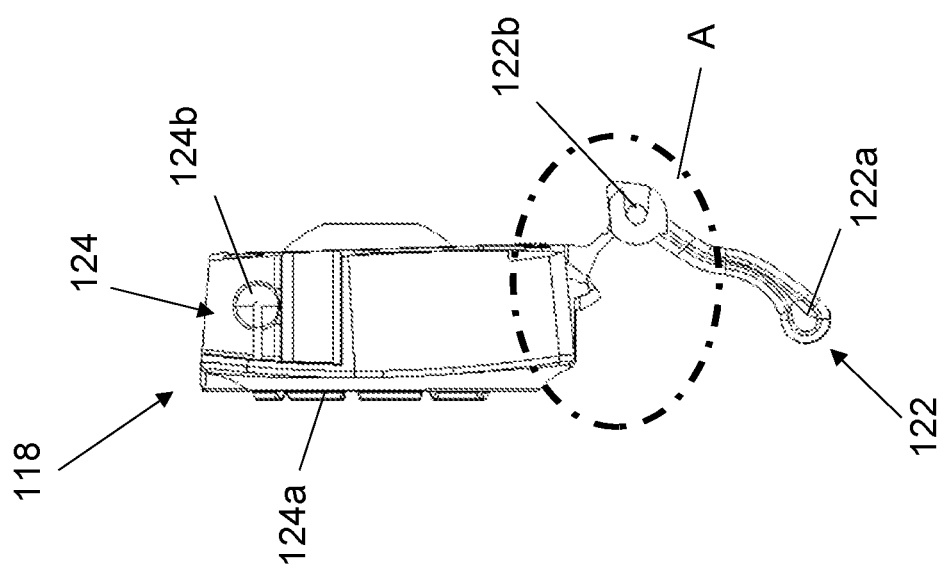
FIG. 14 is a side view of the toggle assembly of FIGS. 12 and 13.
Figure 17:
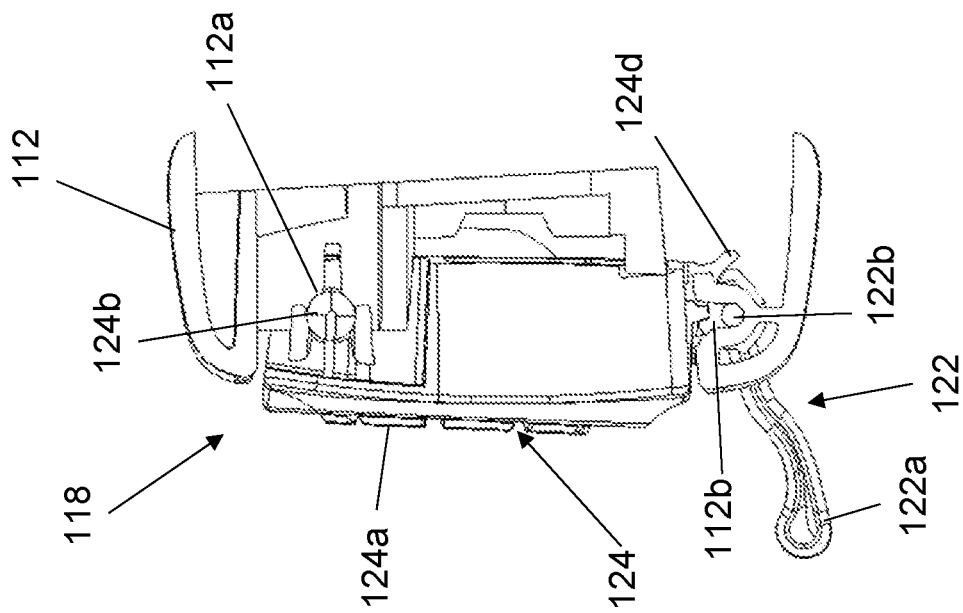
FIG. 17 is a side view showing the breaking of the toggle assembly into two separate parts.
Figure 18:
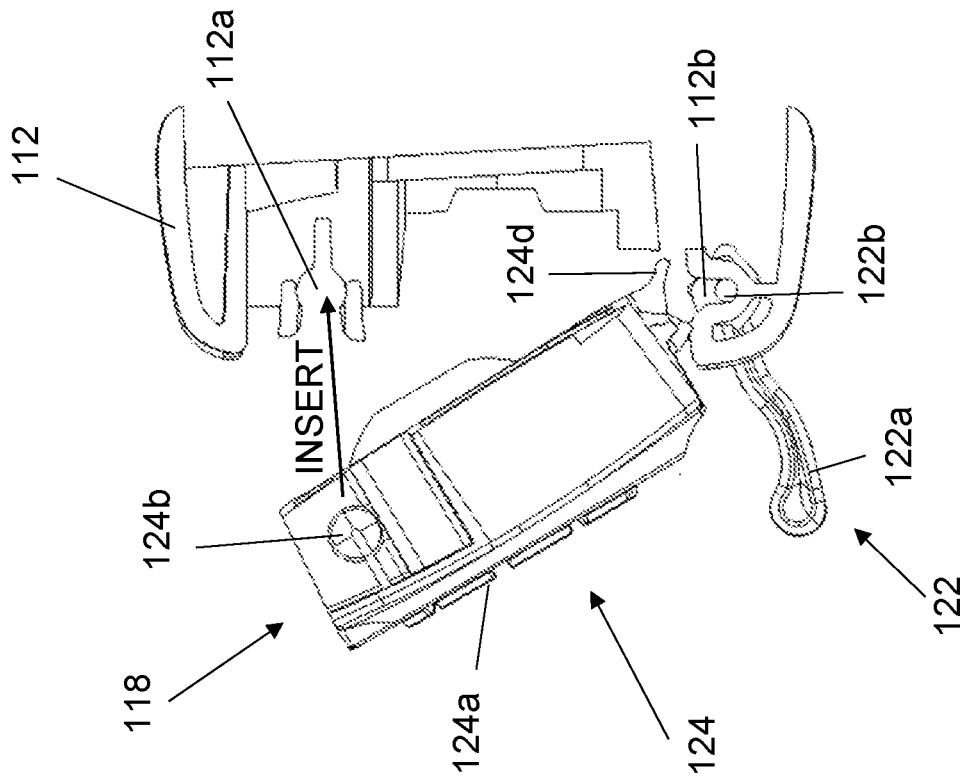
FIG. 18 is a side view showing attachment of the upper part of the toggle assembly at an upper part of the mirror casing.

Optionally, and such as shown in FIGS. 12-14, the toggle mechanism 118 is formed (such as via injection molding of a polymeric resin material) as a unitary or single part, with a narrowed or frangible section or thin web 120 between the lower toggle or lever portion 122 and the upper or body portion 124. The toggle mechanism thus may be formed as and provided as a single part, and may be broken or separated into two parts (the body portion and the toggle lever) during assembly or installation of the toggle mechanism at the mirror casing and mirror head.

The body portion 124 of the toggle mechanism 118 includes a socket or receiving portion 124a that is configured to receive a ball member of the mounting portion 16 to pivotally mount the mirror head at the mounting portion. The body portion 124 also includes a pair of upper pivot mounts or bosses or pins 124b that are configured to be received in correspondingly formed receiving portions or recesses 112a of the mirror casing 112 (see FIGS. 15-18) to pivotally mount the body portion 124 at the mirror casing, such that the mirror casing 112 pivots relative to the body portion 124 (and thus relative to the ball member and mounting portion 16) when the toggle lever 122 is flipped or pivoted, as discussed below.

The toggle lever 122 of the toggle mechanism includes an actuator portion or tab 122a (that the user grasps to flip the toggle lever at the rear of the mirror casing) and a pair of pivot mounts or bosses 122b that are configured to be pivotally received at correspondingly formed receiving portions or recesses 112b at the lower portion of the mirror casing (FIGS. 15-18). The pivot mounts or pins 122b may comprise plastic molded parts of the toggle mechanism 118 or may comprise insert molded pins (such as a metal pin that has the toggle mechanism molded over it to attach and retain the pin at the toggle lever 122). The toggle lever 122 includes a toggling or engaging portion 122c between the pivot mounts 122b for engaging a corresponding engaging portion 124c of the body portion when the toggle 118 is installed at the mirror casing and the frangible web is broken to separate or unjoin the two parts of the toggle mechanism.

The frangible web 120 is disposed at or near the pivot mounts 122b and is at a lower end of a downward extending tab 124d of the body portion 124. The frangible web 120 joins the toggle lever 122 and the body portion 124 when the toggle mechanism 118 is initially formed or molded and until the toggle is installed at the mirror casing 112 of the mirror head. When the toggle mechanism 118 is installed at the mirror casing, the frangible web is broken to provide a two piece toggle mechanism or assembly.

Thus, the two piece toggle mechanism is molded as one piece and separated upon assembly of the toggle mechanism at the mirror casing. The thin web that joins the two pieces (the toggle lever and the toggle body) is designed to break away when bent. The thinnest cross sectional area of the web is designed to leave a clean break with no jagged edges or burrs. The two parts (the toggle lever and the toggle body) are thus designed to break apart without leaving any more than the two pieces (the toggle lever and the toggle body), with no loose remaining pieces or fragments. This allows for a two-piece toggle mechanism to be assembled as easily as a single piece toggle.

As shown in FIGS. 15-18, the single piece molded toggle mechanism 118 is provided at and installed at the rear of the mirror casing 112. The pivot mounts 122b of the toggle lever 122 are inserted into or received at or snapped to the receiving portions 112b of the mirror casing 112 (FIGS. 15 and 16) to attach the toggle lever 122 at the lower portion of the mirror casing 112. When the pivot mounts 122b are attached at the receiving portions 112b of the mirror casing 112, the toggle lever 122 and the body portion 124 are bent toward one another (and away from the mirror casing and reflective element) to cause the thin web 120 to break (see FIGS. 16 and 17). After the body portion 124 is separated from the toggle lever 122, the pivot mounts 124b of the body portion 24 are inserted into or received at or snapped to the receiving portions 112a of the mirror casing 112 (FIGS. 17 and 18) to attach the body portion 124 at the upper portion of the mirror casing 112. When the body portion 124 and the toggle lever 122 are attached at the respective receiving portions 112a, 112b of the mirror casing 112, the toggling or engaging portion 122c engages the corresponding engaging portion 124c of the body portion, whereby pivotal movement of the toggle lever 122 (by a user or driver or occupant of the vehicle) causes pivotal movement of the mirror casing relative to the body portion 124 and the mounting portion 16 to flip or adjust the mirror head and mirror reflective element between the daytime reflecting position and the nighttime reflecting position.

Although shown and described as having the pivot mounts of the toggle lever inserted into the lower receiving portions of the mirror casing before the frangible thin web is broken, the pivot mounts 124b of the body portion 124 may be first inserted into the upper receiving portions 112a of the mirror casing, before the frangible thin web is broken, whereby, after the thin web is broken, the pivot mounts of the toggle lever are inserted into the lower receiving portions of the mirror casing to complete the installation or assembly of the toggle mechanism at the mirror casing.

In the home or daytime reflecting position, the toggle positions the mirror reflector surface of the prismatic reflective element 14 at a direct reflection viewing angle, which is intended to reflect more light toward the driver. In the actuated or angled or nighttime or glare reflecting position, the toggle positions the mirror reflector surface of the prismatic reflective element 14 at an offset reflection viewing angle, which provides a reduced glare and brightness of light reflected toward the driver's eyes, relative to the direct reflection viewing angle.

The reflective element and mirror casing are adjustable relative to a base portion or mounting assembly to adjust the driver's rearward field of view when the mirror assembly is normally mounted at or in the vehicle. The sockets and ball members of the mounting structure may utilize aspects of the pivot mounting assemblies described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, and/or U.S. Publication No. US-2018-0297526, which are hereby incorporated herein by reference in their entireties.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, which are hereby incorporated herein by reference in their entireties) or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. The interior prismatic reflective element may utilize aspects of the reflective elements and mirror assemblies described in U.S. Pat. Nos. 7,420,756; 7,338,177; 7,289,037; 7,274,501; 7,255,451; 7,249,860; 6,598,980; 6,318,870; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

The mirror assembly may comprise or utilize aspects of other types of casings or the like, such as described in U.S. Pat. Nos. 7,338,177; 7,289,037; 7,249,860; 6,439,755; 4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A method of assembling a mirror head for a vehicular interior rearview mirror assembly, the method comprising:

providing a mirror casing, wherein the mirror casing comprises an upper receiving portion and a lower receiving portion;

providing a prismatic reflective element at the mirror casing;

providing a toggle mechanism comprising (i) a body portion and (ii) a toggle lever joined to the body portion via a frangible portion of the toggle mechanism;

one selected from the group consisting of (i) inserting a pivot mount of the body portion into the upper receiving portion of the mirror casing or (ii) inserting a pivot mount of the toggle lever into the lower receiving portion of the mirror casing;

separating the body portion from the toggle lever via breaking the frangible portion;

after breaking the frangible portion, one selected from the group consisting of (i) inserting a pivot mount of the toggle lever into the lower receiving portion of the mirror casing or (ii) inserting a pivot mount of the body portion into the upper receiving portion of the mirror casing; and wherein, when the pivot mount of the toggle lever or body portion is inserted into the respective lower or upper receiving portion of the mirror casing, corresponding engaging surfaces of the body portion and the toggle lever engage one another such that, when the toggle lever pivots relative to the lower receiving portion of the mirror casing, the mirror casing pivots relative to the body portion to, when the mirror head is mounted at a mirror mount at an interior portion of a vehicle, flip the mirror head between a daytime reflecting orientation and a nighttime reflecting orientation.

2. The method of claim 1, comprising inserting the pivot mount of the body portion into the upper receiving portion of the mirror casing, and, after breaking the frangible portion, inserting the pivot mount of the toggle lever into the lower receiving portion of the mirror casing, wherein, when the pivot mount of the toggle lever is inserted into the lower receiving portion of the mirror casing, corresponding engaging surfaces of the body portion and the toggle lever engage one another such that, when the toggle lever pivots relative to the lower receiving portion of the mirror casing, the mirror casing pivots relative to the body portion to, when the mirror head is mounted at the mirror mount at the interior portion of the vehicle, flip the mirror head between the daytime reflecting orientation and the nighttime reflecting orientation.

3. The method of claim 1, comprising inserting the pivot mount of the toggle lever into the lower receiving portion of the mirror casing, and, after breaking the frangible portion, inserting the pivot mount of the body portion into the upper receiving portion of the mirror casing, wherein, when the pivot mount of the body portion is inserted into the upper receiving portion of the mirror casing, corresponding engaging surfaces of the body portion and the toggle lever engage one another such that, when the toggle lever pivots relative to the lower receiving portion of the mirror casing, the mirror casing pivots relative to the body portion to, when the mirror head is mounted at the mirror mount at the interior portion of the vehicle, flip the mirror head between the daytime reflecting orientation and the nighttime reflecting orientation.

4. The method of claim 1, wherein breaking the frangible portion comprises bending the toggle mechanism at the frangible portion until the frangible portion breaks.

5. The method of claim 4, wherein bending the toggle mechanism comprises bending the body portion and the toggle lever toward one another.

6. The method of claim 1, wherein providing the toggle mechanism comprises injection molding the toggle mechanism from a polymeric resin.

7. The method of claim 6, wherein injection molding the toggle mechanism comprises insert molding the pivot mount of the toggle lever at the toggle lever.

8. The method of claim 7, wherein injection molding the toggle mechanism comprises injection molding the toggle lever and the body portion and joining the toggle lever at the body portion via the frangible portion via the same injection molding process.

9. The method of claim 1, wherein the body portion comprises a pivot element that adjustably attaches at the mirror mount at the interior portion of the vehicle.

10. The method of claim 9, wherein the pivot element comprises a socket element that pivotally receives a ball member of the mirror mount.

11. The method of claim 1, comprising (i) providing a socket element at the body portion of the toggle mechanism, (ii) adjustably attaching a ball member of the mirror mount at the socket element of the toggle mechanism to adjustably attach the body portion of the toggle mechanism at the mirror mount.

12. The method of claim 11, wherein providing the socket element comprises molding the socket element out of a first polymeric material, and wherein providing the toggle mechanism comprises overmolding the toggle mechanism out of a second polymeric material at the first polymeric material, and wherein the second polymeric material is more flexible than the first polymeric material.

13. A mirror head assembled via the method of claim 1.

14. A method of assembling a mirror head for a vehicular interior rearview mirror assembly, the method comprising:

providing a mirror casing, wherein the mirror casing comprises an upper receiving portion and a lower receiving portion;

providing a prismatic reflective element at the mirror casing;

providing a toggle mechanism comprising (i) a body portion and (ii) a toggle lever joined to the body portion via a frangible portion of the toggle mechanism, wherein the toggle mechanism comprises an injection molded toggle mechanism with the toggle lever, the body portion and the frangible portion formed and joined via a common injection molding process;

inserting a pivot mount of the body portion into the upper receiving portion of the mirror casing;

separating the body portion from the toggle lever via breaking the frangible portion, wherein breaking the frangible portion comprises bending the toggle mechanism at the frangible portion until the frangible portion breaks;

after breaking the frangible portion, inserting a pivot mount of the toggle lever into the lower receiving portion of the mirror casing; and wherein, with the pivot mount of the body portion inserted into the upper receiving portion of the mirror casing and with the pivot mount of the toggle lever inserted into the lower receiving portion of the mirror casing, corresponding engaging surfaces of the body portion and the toggle lever engage one another such that, when the toggle lever pivots relative to the lower receiving portion of the mirror casing, the mirror casing pivots relative to the body portion to, when the mirror head is mounted at a mirror mount at an interior portion of a vehicle, flip the mirror head between a daytime reflecting orientation and a nighttime reflecting orientation.

15. The method of claim 14, wherein bending the toggle mechanism comprises bending the body portion and the toggle lever toward one another.

16. The method of claim 14, wherein the body portion comprises a pivot element that adjustably attaches at the mirror mount at the interior portion of the vehicle.

17. The method of claim 16, wherein the pivot element comprises a socket element that pivotally receives a ball member of the mirror mount.

18. The method of claim 14, comprising (i) providing a socket element at the body portion of the toggle mechanism, (ii) adjustably attaching a ball member of the mirror mount at the socket element of the toggle mechanism to adjustably attach the body portion of the toggle mechanism at the mirror mount.

19. The method of claim 18, wherein providing the socket element comprises molding the socket element out of a first polymeric material, and wherein providing the toggle mechanism comprises overmolding the toggle mechanism out of a second polymeric material at the first polymeric material, and wherein the second polymeric material is more flexible than the first polymeric material.

20. A mirror head assembled via the method of claim 14.

21. A method of assembling a mirror head for a vehicular interior rearview mirror assembly, the method comprising:
providing a mirror casing, wherein the mirror casing comprises an upper receiving portion and a lower receiving portion;
providing a prismatic reflective element at the mirror casing;
providing a toggle mechanism comprising (i) a body portion and (ii) a toggle lever joined to the body portion via a frangible portion of the toggle mechanism, wherein the toggle mechanism comprises an injection molded toggle mechanism with the toggle lever, the body portion and the frangible portion formed and joined via a common injection molding process;
inserting a pivot mount of the toggle lever into the lower receiving portion of the mirror casing;
separating the body portion from the toggle lever via breaking the frangible portion, wherein breaking the frangible portion comprises bending the toggle mechanism at the frangible portion until the frangible portion breaks;
after breaking the frangible portion, inserting a pivot mount of the body portion into the upper receiving portion of the mirror casing; and
wherein, with the pivot mount of the toggle lever inserted into the lower receiving portion of the mirror casing and with the pivot mount of the body portion inserted into the upper receiving portion of the mirror casing, corresponding engaging surfaces of the body portion and the toggle lever engage one another such that, when the toggle lever pivots relative to the lower receiving portion of the mirror casing, the mirror casing pivots relative to the body portion to, when the mirror head is mounted at a mirror mount at an interior portion of a vehicle, flip the mirror head between a daytime reflecting orientation and a nighttime reflecting orientation.

22. The method of claim 21, wherein bending the toggle mechanism comprises bending the body portion and the toggle lever toward one another.

23. The method of claim 21, wherein the body portion comprises a pivot element that adjustably attaches at the mirror mount at the interior portion of the vehicle.

24. The method of claim 23, wherein the pivot element comprises a socket element that pivotally receives a ball member of the mirror mount.

25. The method of claim 21, comprising (i) providing a socket element at the body portion of the toggle mechanism, (ii) adjustably attaching a ball member of the mirror mount at the socket element of the toggle mechanism to adjustably attach the body portion of the toggle mechanism at the mirror mount.

26. The method of claim 25, wherein providing the socket element comprises molding the socket element out of a first polymeric material, and wherein providing the toggle mechanism comprises overmolding the toggle mechanism out of a second polymeric material at the first polymeric material, and wherein the second polymeric material is more flexible than the first polymeric material.

27. A mirror head assembled via the method of claim 21.

\* \* \* \* \*